May 17, 1938.  R. J. CORRIGAN  2,117,543
TUBE FLARING TOOL
Filed Oct. 14, 1935  3 Sheets-Sheet 1
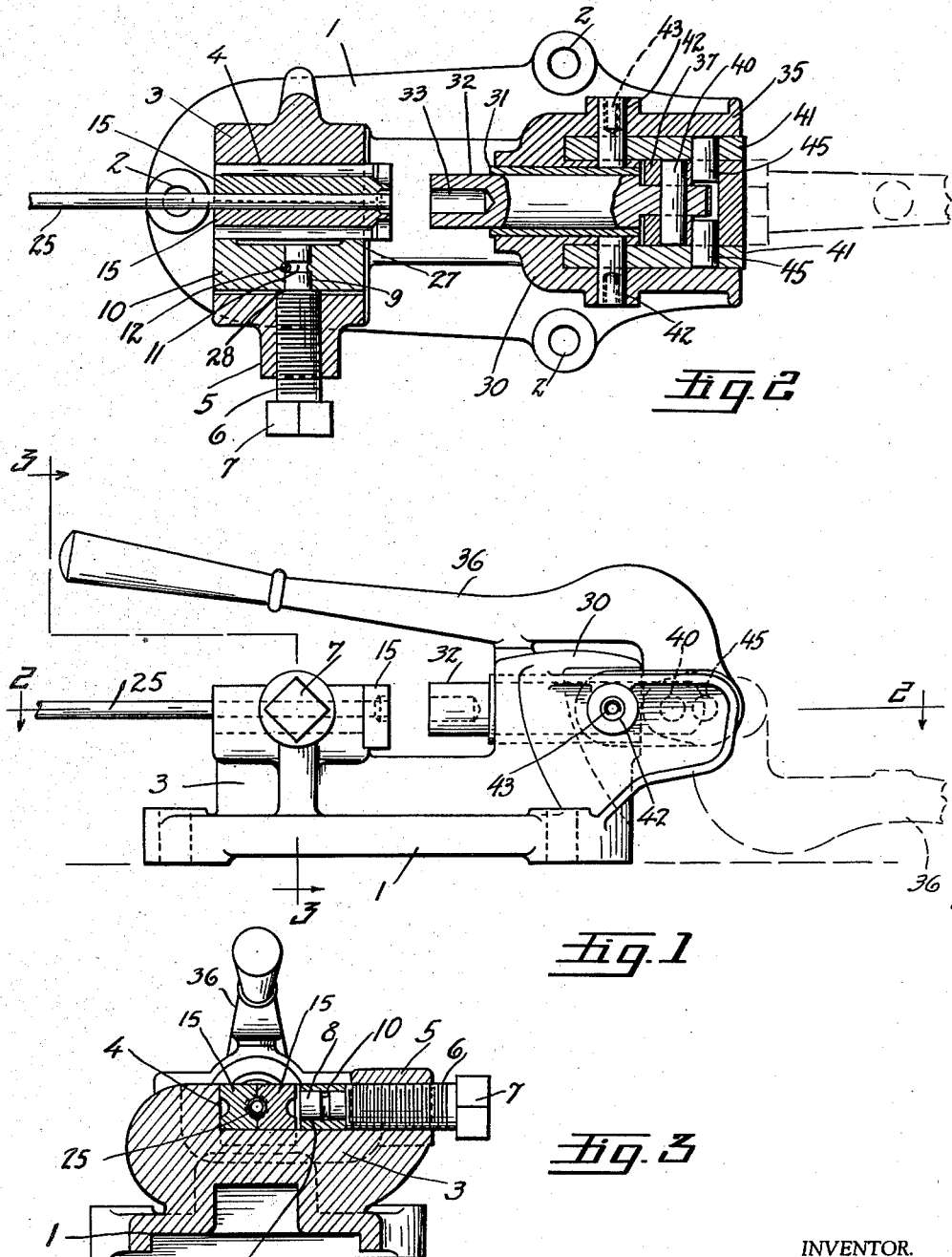
INVENTOR.
Roy J. CORRIGAN
BY
Barnes, Kisselle, Laughlin & Rusch
ATTORNEYS May 17, 1938. R. J. CORRIGAN 2,117,543
TUBE FLARING TOOL
Filed Oct. 14, 1935 3 Sheets-Sheet 2
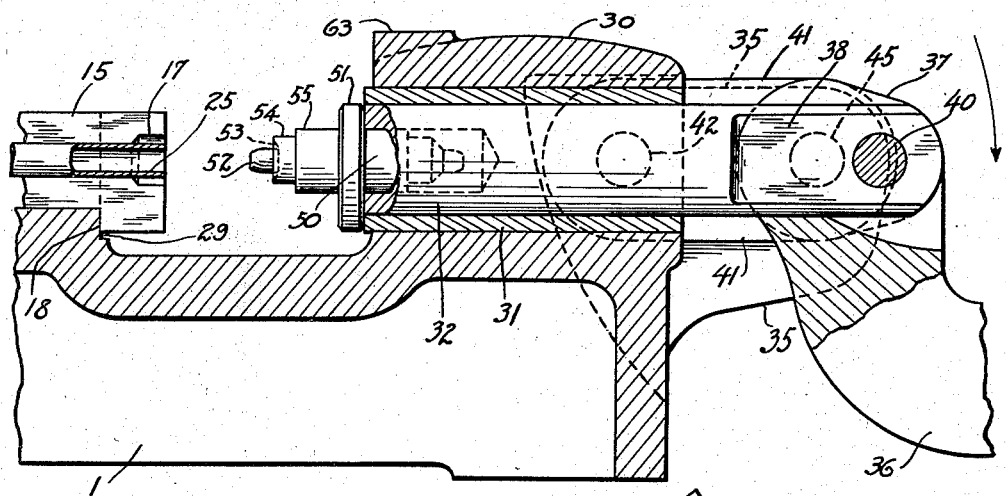
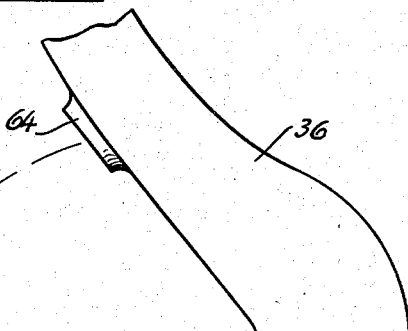
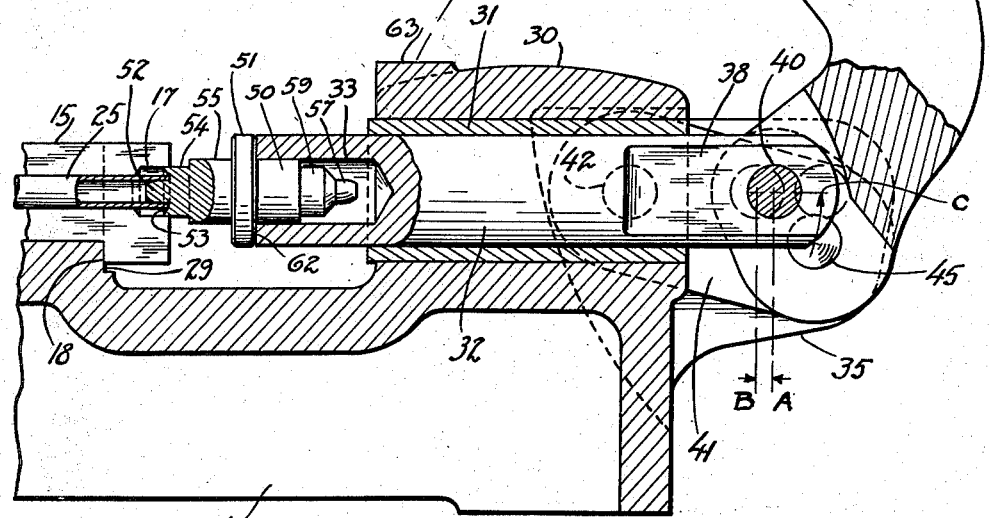
INVENTOR.
Roy J. Corrigan
BY
Barnes, Kisselle, Laughlin & Raisch
ATTORNEYS.

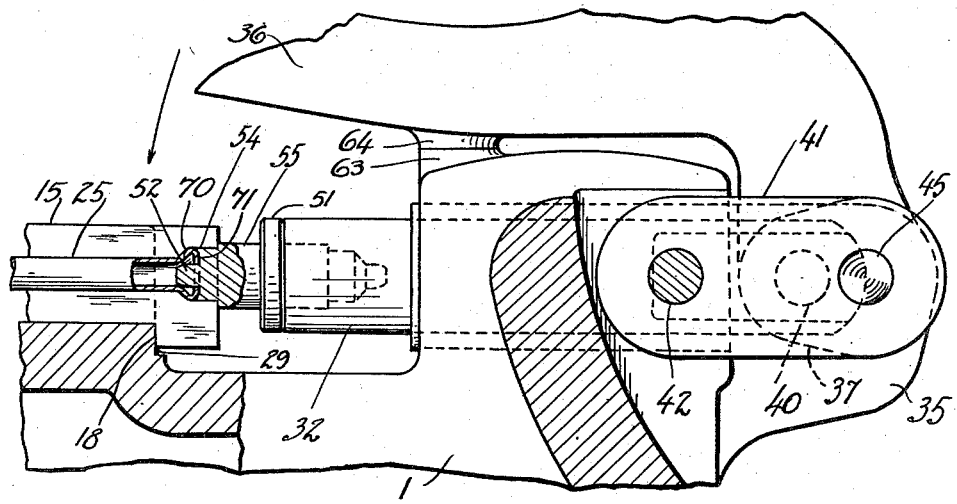

Patented May 17, 1938

2,117,543

UNITED STATES PATENT OFFICE 2,117,543

TUBE FLARING TOOL

Roy J. Corrigan, Detroit, Mich., assignor to Bundy Tubing Company, Detroit, Mich., a corporation of Michigan Application October 14, 1935, Serial No. 44,946

7 Claims. (Cl. 153—79)

This invention relates to a tube flaring tool and is particularly related to a tube flaring tool for use in service shops or repair shops or the like.

The invention is directed to the provision of a tool which may be used in repairing or replacing tube lines in automotive vehicles, although, obviously, the tool is not limited to such use. As is well known to those skilled in the art, automotive vehicles, including both passenger cars and commercial vehicles, are equipped with various tube lines for gasoline, oil and the like, and also tubing is now extensively used for hydraulic brakes of such vehicles. Such tubing is relatively small in diameter and in many cases the connection at the end of a tube line is made by means of a flare on the end of the tube which cooperates with a suitable coupling.

The principal object of the invention is to provide a tool of simple rugged construction advantageously arranged to be operated by hand and which is so designed that the same can be used for flaring tubing of various sizes. In this connection the tool embodies punch and die elements which are readily removable, and the user of such a tool may have a set of such punch and die elements for handling various sizes of tube. To this end the dies may be and preferably are of such construction that each die, which, as shown herein, comprises two die elements, may be used in two different positions for accommodating two different sizes of tube.

A further object is the provision of a tool in which a large leverage advantage is obtained where the tool is hand operated, to the end that the flare may be efficiently formed. This is accomplished by a lever mounting in which the leverage advantage increases during operation of the tool, with the advantage substantially at its greatest point when the most pressure is needed.

Other objects of the invention will become apparent as the detailed description progresses in connection with the accompanying drawings.

Fig. 1 is a side elevational view of the tool showing one position of the operating lever in dotted lines.

Fig. 2 is a cross-sectional view taken substantially on line 2—2 of Fig. 1.

Fig. 3 is a cross-sectional view taken on line 3—3 of Fig. 1.

Fig. 4 is an enlarged view principally in cross-section showing the tool, punch, die and tube in position ready for operation.

Fig. 5 is a view similar to Fig. 4 illustrating the position of the parts after the operating lever has been rocked, and also illustrating the mounting for the lever.

Fig. 6 is a view similar to Figs. 4 and 5 illustrating the final position of the parts in one operation of the flaring of the end of a tube.

Fig. 7 is a view similar to Fig. 6 largely in cross-section showing the punch reversed and the completion of the flaring operation.

Fig. 8 is a perspective view of the die members.

Fig. 9 is an enlarged side view of the punch.

Fig. 10 is a view partly in section illustrating a tube locating element which may be used with the tool.

The tool, as shown herein, comprises a base 1, and it may be equipped with apertures 2 so that it may be bolted down upon a work bench or the like. At one end the base has an upstanding part 3 fashioned to form a groove having a wall 4 and an opposing part 5. A clamp-screw 6 is threaded in the part 5 and it may have a head 7 for the reception of a wrench or the like. The end of the clamp-screw is reduced, as shown at 8, and pivotally fitted relatively loosely in an aperture 9 of a clamping block 10. The reduced end of the screw may have an annular groove 11 therein and a cross pin 12, which is carried by the clamping block, fits into the groove to hold the block and screw in assembly. The head of the screw may be formed in any manner for turning the same, other than having a square head; as for example, a turning handle may be permanently attached to the end of the screw.

Die members are arranged to be held clamped between the wall 4 and the clamping block 10. A pair of such die members are shown in Fig. 8. Each die member has a body 15 grooved as at 16. The grooves each have an enlarged part 17 which cooperate to form a die. Also, each die member has a shoulder 18. The same reference characters are applied to each die member as they are the same, except that they are arranged in rights and lefts. In the form shown each die member has a second groove 19 and enlargement 20. The grooves 17 are designed to take one size of tube and the grooves 19 are designed to take another size of tube.

The dies are placed in the channel of the member 3, as illustrated in Figs. 2 and 3, with the tube, shown at 25, between the dies. The grooves for taking a particular size of tube are preferably slightly under size as regards the tube so that when the dies are clamped in position by the clamping block 10 the tube is tightly held so that it will not move longitudinally. The engaging face of the clamping block is preferably backed away, as shown at 26, leaving engaging faces 27 so that the die member in contact therewith is engaged near its ends. Thus any irregularities which may occur are minimized and the clamping block may rock slightly on the reduced end 8 of the screw, the rocking taking place on the shoulder 28. The shoulders 18 of the dies abut against a shoulder 29 on the base, so that they are held from moving away from the ram as the ram approaches the same. (Figs. 4 and 5.)

The opposite end of the tool has an upstanding part 30 which has a bore therein in which is positioned a bushing 31, and in the bushing is positioned a ram 32. The ram is provided with a recess in one end, as shown at 33. The part 30 has two rearwardly extending parts 35. An operating lever 36 has bifurcated parts 37 fitting over one end of the ram which is milled to have flat surfaces. This milled end of the ram is shown at 38, and the lever is pivoted thereto by a pin 40, the ram and bifurcated parts of the lever having apertures for this purpose. A pair of links 41 are positioned just within the projecting members 35 and are fulcrumed on pins 42. These pins are preferably non-rotatably carried by the parts 35, as by means of a tight fit, and they may be installed or removed by means of a tool designed to be attached to the pins by screw threads, for which purpose each pin 42 has a tapped aperture 43. The bifurcated parts of the lever are pivotally connected to the links by pins 45.

By rocking the lever the ram is reciprocated in the bushing. In open position, as shown in Fig. 4, the pin 40 connecting the lever and ram is positioned to the right of the pins 45, and is removed from the fulcrum pins 42 a distance greater than the distance between the centers of the pins 42 and 45. As the lever is rocked counter-clockwise, as shown in Fig. 5, the pin 40 necessarily moves in a straight line to the left, but the links swing into the position as shown. Upon further movement, as illustrated in Figs. 1 and 2, the pin 40 lies between the pins 42 and 45. By this link structure a straight line movement of the ram is obtained without resorting to a sliding connection, such as a slot and pin connection. The lever is, in effect, mounted on a moving fulcrum which comprises the pins 45, and the fulcrum swings around the pins 42.

A punch member is shown in Fig. 9 having a body 50 with a flange 51 substantially centrally positioned. One end of the die has a projecting part 52, at the base of which is a recess 53 and an intermediate portion 54. An enlarged part 55 has a shoulder 56 defining the end of the intermediate part 54. The opposite end of the punch has a projecting part 57 and an inclined or tapered part 58 between the end 57 and an intermediate portion 59.

A tube locating element is shown in Fig. 10 and it may comprise a cylinder of metal having a relatively small part 60 and a larger part 61, thus providing a shoulder 62. The base of the tool and lever may have contacting projections 63 and 64 for limiting lever movement.

In use the proper dies are located in the base of the tool with a tube confined in the facing grooves. The end of the tube should be in alignment with the end of the dies. To thus locate the tube the locating element may be positioned in the ram, as shown in Fig. 10, and the lever swung so that the tube is backed away until its end is flush with the forward end of the dies. This also positions the dies by forcing the die elements back against the shoulder 29. The tube is then clamped between the dies and the dies held in position by the clamping screw 6 and block 10.

The lever may now be swung to open position, and the punch located, as shown in Fig. 4. The lever is now swung, as illustrated in Fig. 5, and first the end 52 of the punch enters the tube as shown. Upon further movement of the lever, as shown in Fig. 6, the tube is fashioned with a roll or bead formation 70, with the extreme end of the tube extending inwardly as at 71. The end 52 of the punch acts as a pilot or mandrel to keep the tube from collapsing. At this time the part 54 of the punch enters the enlargements 17 of the dies and the tube is properly fashioned when the shoulder 56 abuts against the dies. The shape of the bead or roll is determined by the shape of the die recess and the recess 53. The lever may now be swung to retract the ram and the punch reversed, as shown in Fig. 7. The lever is again swung to advance the ram, at which time the end 57 of the punch enters the tube and serves as a pilot or mandrel, and the bevel face 58 folds inwardly the extreme end 71 of the tube. This forms a flare with a double layer of metal, as shown at 73. At this time the punch preferably does not abut against the dies, since it is desired to tightly compress the metal of the flare, as there is no need of limiting the movement of the ram in this manner.

This form of flare is especially useful on tubing which is made from strip steel stock fashioned into tubular form and sealed with metal which has been rendered molten. Such tube has become widely known and used in the automotive industry, and is termed "Bundy" tube. The steel tube, however, does not lend itself to an ordinary flare where the end of the tube is merely expanded, as the steel is not very ductile and the same is liable to split. However, in fashioning the bead 70, the large part thereof where the metal is stretched or expanded the most is reinforced by the tube body on one side, and by the extreme end 71 of the tube on the other. Of course, this method of making a flare and the resultant flare structure may be used as well on tube of any kind and of any metal.

The mounting of the lever on a movable fulcrum which is effected by the link structure affords a great lever advantage at the time when this advantage is particularly needed, without resorting to the use of an unduly long lever. The lever advantage is at its minimum when a line drawn to the centers of the pin 40 and pins 45 is substantially at a right angle to the ram. This will be appreciated by reference to Fig. 5. In this condition, with the ram horizontal, a line through the centers of pins 40 and 45 would be vertical. Fig. 5 is laid out fairly accurately and demonstrates that the movement of the ram, calculated from the center line of pin 40, is from point A to B as the center line of pins 45 shifts from the position shown to the center line of the ram indicated at C. The centers of pin 42 and pin 40 are in the same plane and substantially on the center line of the ram. As the center line of pins 45 approach the point C the movement of the ram grows progressively less by a given movement of the lever. In fact, the movement of the ram becomes imperceptible as the center line of pins 45 arrives at the center line C, and a reverse action of the ram would be obtained if the pin centers passed over the center ram C. It will be seen, therefore, that this movement gives a tremendous leverage for the purpose of squeezing the flared metal parts tightly together, as shown in Fig. 7. It will be understood that the tool, especially so far as the die holding structure and lever mounting is concerned, may be used for making any kind of a flare on a tube or otherwise treating the end of a tube or other similar article, and that the tool to this extent is not limited to fashioning the double flare as shown herein.

I claim:

1. In a tool substantially for the purpose described, a base, a ram reciprocably mounted in the base, a link pivoted to the base, an operating lever, means pivotally connecting the operating lever and the ram, and means pivotally connecting the operating lever to the link and at a point on the lever removed from the pivotal connection between the lever and ram and forming a moving fulcrum for the lever, the distance between the centers of the pivotal connections between the lever and the ram and the lever and the link, being less than the distance between the centers of the pivotal connections between the link and the base and the link and the lever.

2. In a tool for flaring tube or the like, a base, a die comprising a pair of die members, each having a groove in one side for receiving a tube when in matched relation, said grooves each having an enlarged part at one end which cooperate, in matched relation, to form a die recess, said die members each having another groove of different size than the first mentioned groove for receiving a tube of different size when in matched relation and each of the second named grooves having an enlarged part at one end which, in matched relation, form a die recess.

3. In a tube flaring tool, a base having a channel way, a die comprising separate die members, each having a groove and said grooves adapted to receive a tube when in matched relation, a clamping screw threaded to the base, a clamping block in the channel way operably associated with the screw and for clamping the die members in the channel way by the action of the screw, said clamping block having end portions for engaging a die member at spaced points and with the center portion between the spaced points relieved, and said block having a pivotal action relative to the clamping screw.

4. In a tube flaring tool, a base having a channel way, a die comprising a pair of grooved die members adapted to be placed in the channel way and to receive a tube in the grooves when the same are in matched relation, a clamping screw threaded in the base, a clamping block in the channel way and mounted upon the clamping screw and capable of pivotal movement with respect thereto, said clamping block having surfaces which engage a die member at spaced points and on opposite sides of the clamping screw.

5. In a tube flaring tool, a base, a die for receiving a tube, means for holding the die in operating position on the base, a ram mounted on the base and reciprocable toward and away from the die, and a double ended punch arranged to be carried by the ram having one end for performing an initial operation on the end of a tube in the die and another end for performing a second operation on the end of the tube in the die to flare the tube, said punch having an intermediate enlargement for fitting with the ram.

6. In a tube flaring tool, a base, a die for receiving a tube, means for holding the die in operating position on the base, a ram mounted on the base and reciprocable toward and away from the die, said ram having a recess in its end adjacent the die, and a double ended punch comprising a body with an intermediate collar, the body of the punch on either side of the collar adapted to be received in the recess of the ram, one end of the punch having a pilot adapted to enter the tube and serve as a mandrel, and the punch having an enlarged portion at the end of the pilot provided with a recess, said end of the punch adapted to perform an initial operation on the end of the tube, the opposite end of the punch having a tapered portion adapted to enter the die and compress the metal of the end of the tube against the die walls and cause flaring of the tube.

7. In a tube flaring tool, a base, a die for receiving a tube, means for holding the die in operating position on the base, a ram mounted for reciprocable movement toward and away from the die, said ram having a recess in the end adjacent the die, a punch member having a body portion and an intermediate enlarged part, the body portions on opposite sides of the enlarged part adapted to be slidably received in the recess in the ram, with the enlarged part abutting against the end of the ram, opposite ends of the punch member having working portions for performing different operations on the end of the tube in the die for flaring the tube.

ROY J. CORRIGAN.